UNITED STATES PATENT OFFICE.

ROBERT GNEHM AND JAKOB SCHMID, OF BASLE, SWITZERLAND, ASSIGNORS TO THE SOCIETY OF CHEMICAL INDUSTRY, OF SAME PLACE.

VIOLET DYE.

SPECIFICATION forming part of Letters Patent No. 478,005, dated June 28, 1892.

Application filed January 14, 1892. Serial No. 418,082. (Specimens.) Patented in Germany December 28, 1890, No. 58,689, and in France May 2, 1891, No. 213,211.

*To all whom it may concern:*

Be it known that we, ROBERT GNEHM and JAKOB SCHMID, citizens of Switzerland, residing at Basle, Switzerland, have invented new and useful Improvements in the Production of a Violet Coloring-Matter or Dye-Stuff, (for which we have obtained patents in France, No. 213,211, dated May 2, 1891, and in Germany, No. 58,689, dated December 28, 1890,) of which the following is a specification.

Our invention relates to the production of a new violet coloring-matter by condensation of pyrogallol with an alkylized diamido-benzophenone, such as tetramethyldiamido-benzophenone or tetraethyldiamido-benzophenone. The dye-stuff obtained by said condensation belongs to the rosaniline group, and has the property to dye on mordanted wool and cotton. According to the nature of the mordants which may be used, violet to blue shades are obtained. If dyed on chrome mordants, the shades possess great fastness to soap. The formation of the dye-stuff may be expressed in a general way by the following formula:

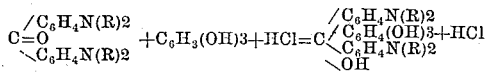

where R represents methyl ($CH_3$) or ethyl ($C_2H_5$.) The condensation of pyrogallol with tetra alkylized-diamido benzophonone can be effected by the aid of various condensing agents, of which muriatic acid, sulphuric acid, chloride of phosphorus, phosgene, and chloride of zinc, or mixtures of these substances have proved particularly practical and advantageous.

The following is an example in which our invention can be carried out in practice: Dissolve twenty parts, by weight, of tetramethyldiamido-benzophenone in the triple or quadruple quantity of sulphuric acid containing about eighty per cent. of real sulphuric acid, ($SO_4H_2$); cool the solution to about 0° centigrade, (freezing-point,) and gradually add 9.5 parts of pyrogallol. Introduce muriatic-acid gas during two to three days at a low temperature until the condensation is terminated. The product of the reaction is diluted with water, and by neutralization of the excess of sulphuric acid and muriatic acid with soda-salt the chlorhydrate of the dye-stuff separates out as a lump of a metallic luster. By dissolving this lump in dilute warm acetic acid and precipitating the filtered solution with common salt the dye-stuff is obtained pure as a greenish glittering crystalline powder. In place of tetramethyldiamido-benzophenone tetraethyldiamido-benzophenone may be employed.

Our new dye-stuff has the following characteristic properties: It forms a greenish glittering crystalline powder of an intense metallic luster, which dissolves difficultly in cold water, but easily in hot water, with a green-blue color and an intense dichroism. It is scarcely soluble in ether and benzine, but dissolves in alcohol with a red-violet color, also in concentrated muriatic acid with a red and in concentrated sulphuric acid with an orange-yellow color, which turns into red when diluted with water, and on wool and cotton mordanted with chrome our new coloring-matter produces violet shades, which resist very well to soaping and milling.

What we claim as new, and desire to secure by Letters Patent, is—

1. The process of producing a new dye-stuff, which process consists in treating a mixture consisting of tetra alkylized diamido-benzophenone, sulphuric acid, and pyrogallol with a condensing agent, such as muriatic acid, diluting the product obtained with water, neutralizing the excess of acid with soda-salt, dissolving the neutralized product, and precipitating the filtered solution with common salt, substantially as described.

2. As a new product, the violet coloring-matter obtained by the condensation of pyrogallol with a tetra alkylized diamido-benzophenone, which is a greenish glittering crystalline powder of an intense metallic luster, difficultly soluble in cold water, easily soluble in hot water, practically insoluble in benzine and ether, soluble in alcohol, and also in muriatic and concentrated sulphuric acids.

In testimony whereof we have hereunto set our hands in the presence of two subscribing witnesses.

ROBERT GNEHM.
JAKOB SCHMID.

Witnesses:
GEORGE GIFFORD,
L. C. BRYAN.